(12) United States Patent
Luo et al.

(10) Patent No.: US 10,379,301 B2
(45) Date of Patent: Aug. 13, 2019

(54) MULTI-CHANNEL PARALLEL OPTICAL RECEIVING DEVICE

(71) Applicant: Global Technology Inc., Ningbo (CN)

(72) Inventors: Jian-Hong Luo, Ningbo (CN); Dong-Biao Jiang, Ningbo (CN); Peng Nie, Ningbo (CN); Xiao-Liang Ding, Ningbo (CN)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/432,242

(22) Filed: Feb. 14, 2017

(65) Prior Publication Data
US 2017/0336582 A1 Nov. 23, 2017

(30) Foreign Application Priority Data
May 23, 2016 (CN) .................. 2016 1 0346007.8

(51) Int. Cl.
*G02B 6/42* (2006.01)
*G02B 6/12* (2006.01)
*G02B 6/32* (2006.01)

(52) U.S. Cl.
CPC ....... *G02B 6/4249* (2013.01); *G02B 6/12019* (2013.01); *G02B 6/32* (2013.01); *G02B 6/4214* (2013.01); *G02B 6/4281* (2013.01)

(58) Field of Classification Search
CPC .... G02B 6/12019; G02B 6/32; G02B 6/4214; G02B 6/4249
See application file for complete search history.

(56) References Cited

U.S. PATENT DOCUMENTS

| 5,617,234 A | 4/1997 | Koga et al. |
| 6,305,848 B1 | 10/2001 | Gregory |
| 7,058,263 B2 | 6/2006 | Welch et al. |

(Continued)

OTHER PUBLICATIONS

PCT Search Report and Written Opinion dated Jul. 6, 2017, received in corresponding PCT Application No. PCT/US17/29350, 9 pgs.

(Continued)

*Primary Examiner* — Daniel Petkovsek
(74) *Attorney, Agent, or Firm* — Grossman Tucker Perreault & Pfleger, PLLC (57) ABSTRACT

The present disclosure provides a multi-channel parallel optical receiving device, including a carrier, a light receiving chip, a plurality of optoelectronic diodes disposed on a top surface of an end of the carrier, an optical fiber connector disposed in another end of the carrier, and an arrayed waveguide grating disposed on the top surface of the carrier. The plurality of optoelectronic diodes is electrically connected to the light receiving chip, and an input end of the arrayed waveguide grating is connected to the optical fiber connector for receiving an optical signal from the optical fiber. The optical signals are divided into multi-channel optical signals in parallel. The top surface of an output end of the arrayed waveguide grating is at a predetermined angle, causing the multi-channel optical signals to be reflected by the top surface and to photosensitive surfaces of the optoelectronic diodes arranged in parallel.

7 Claims, 6 Drawing Sheets

(56) References Cited

U.S. PATENT DOCUMENTS

| | | | |
|---|---|---|---|
| 7,162,124 B1* | 1/2007 | Gunn, III | G02B 6/30 |
| | | | 385/27 |
| 7,329,054 B1 | 2/2008 | Epitaux et al. | |
| 7,376,308 B2 | 5/2008 | Cheben et al. | |
| 7,532,783 B2 | 5/2009 | Bai | |
| 7,941,053 B2 | 5/2011 | Dallesasse | |
| 8,831,433 B2 | 9/2014 | Ho et al. | |
| 9,341,786 B1* | 5/2016 | Gamache | G02B 6/30 |
| 9,476,763 B2 | 10/2016 | Kachru et al. | |
| 9,482,819 B2 | 11/2016 | Li et al. | |
| 9,553,671 B1 | 1/2017 | Nagarajan et al. | |
| 9,557,500 B1 | 1/2017 | Luo et al. | |
| 10,088,639 B2 | 10/2018 | Mentovich et al. | |
| 2003/0174964 A1* | 9/2003 | Gao | G02B 6/1221 |
| | | | 385/49 |
| 2004/0161186 A1* | 8/2004 | Crafts | G02B 6/12004 |
| | | | 385/14 |
| 2012/0301152 A1 | 11/2012 | Edwards et al. | |
| 2015/0249501 A1 | 9/2015 | Nagarajan | |
| 2015/0256259 A1 | 9/2015 | Huang et al. | |
| 2015/0316732 A1 | 11/2015 | Schamuhn et al. | |
| 2016/0131854 A1 | 5/2016 | De Jong | |
| 2016/0149662 A1* | 5/2016 | Soldano | G02B 6/30 |
| | | | 398/51 |
| 2016/0349451 A1* | 12/2016 | Shen | G02B 6/12019 |
| 2017/0168252 A1* | 6/2017 | Pezeshki | G02B 6/4246 |
| 2017/0187462 A1 | 6/2017 | Luo et al. | |
| 2017/0248763 A1 | 8/2017 | Kawamura et al. | |
| 2017/0307819 A1 | 10/2017 | Ho et al. | |
| 2019/0018206 A1 | 1/2019 | Luo et al. | |

OTHER PUBLICATIONS

U.S. Office Action dated Aug. 21, 2017, received in U.S. Appl. No. 15/137,823, 13 pgs.

U.S. Office Action dated Mar. 18, 2019, received in related U.S. Appl. No. 15/971,621, 17 pgs.

U.S. Office Action dated Apr. 16, 2019, received in related U.S. Appl. No. 16/142,466, 23 pgs.

* cited by examiner

MULTI-CHANNEL PARALLEL OPTICAL RECEIVING DEVICE

TECHNICAL FIELD

The present disclosure relates to fiber optical communications, and, more particularly, to multi-channel parallel optical receiving modules.

BACKGROUND

The optical receiving module refers to a device used in the field of the fiber optical communication for receiving an optical signal from an optical fiber and converting the received optical signal into an electrical signal. With the corresponding market continuing to grow, the demands of product cost and performance become stricter and stricter. In the current optical communication of the dada center, transmitting speed of a single channel of product and the number of the channels must increase in order to improve the overall performance of the datacenter whose limited physical space puts restraint on density of the products. Hence, in many circumstances, multi-channel paralleling lights need to be enabled in the optical module. The data transmission of the optical modules needs to be implemented by connecting the optical modules, and the optical modules are connected by a jumper, resulting in higher cost.

SUMMARY

The present disclosure overcomes the currently existing technical drawback. The present disclosure provides a multi-channel parallel optical receiving module capable of achieving multi-channel receiving and transmitting. Further, the disclosed module is reliable and could be manufactured with reduced cost.

The present disclosure provides a multi-channel parallel optical receiving module including a carrier and a light receiving chip. A plurality of optoelectronic diodes may be disposed in array on a top surface of an end of the carrier, and the optoelectronic diodes may be electrically connected to the light receiving chip. An optical fiber connector may be disposed in another end of the carrier. An arrayed waveguide grating may be further disposed on the top surface of the carrier, and an input end of the arrayed waveguide grating may be connected to the optical fiber connector for receiving an optical signal from the optical fiber. The optical signals may be divided into multi-channel optical signals in parallel by the arrayed waveguide grating based on their wavelengths. The top surface of an output end of the arrayed waveguide grating may be at a predetermined angle so that the multi-channel optical signals may be reflected by the top surface to photosensitive surfaces of the plurality of optoelectronic diodes arranged in array.

With the aforementioned structure, the present disclosure has following features. In the present disclosure, the top surface of the arrayed waveguide grating may be designed to allow for the optical signals emitting from the arrayed waveguide grating to be reflected by the top surface to the photosensitive surfaces of the optoelectronic diodes. Based on such design, after the position of the optoelectronic diodes is determined, only a placement groove or a guiding structure for the arrayed waveguide grating is needed on the carrier to guide the arrayed waveguide grating to be in the position aligning with the optoelectronic diodes. Accordingly, the arrayed waveguide grating may be installed without too much difficulty, and the coupling between the arrayed waveguide grating and the optoelectronic diodes may be no longer necessary. Further, the optoelectronic diodes and the light receiving chip may be disposed on the same surface, simplifying the design of the structure and reducing the length of the bonding wire to enhance the integrity of the entire structure and lower the manufacturing cost of the same.

In some embodiments, the plurality of optoelectronic diodes may be disposed on the same circuit board. With this structure, the position of the optoelectronic diodes may become definitive to simplify and streamline the manufacturing process.

In some embodiments, the amount of the optoelectronic diodes may be equal to the amount of the optical paths divided by the arrayed waveguide grating.

In some embodiments, the predetermined angle of the top surface of an output end of the arrayed waveguide grating may be 41 to 46 degrees.

In some embodiments, the predetermined angle of the top surface of the output end of the arrayed waveguide grating may be 42 degrees.

In some embodiments, a first lens, for coupling the optical fiber, may be disposed between the input end of the arrayed waveguide grating and the optical fiber connector. With this structure, the first lens may be disposed between the optical fiber connector and the arrayed waveguide grating for a coupling process to be finalized.

In some embodiments, the input end of the arrayed waveguide grating may be inserted directly into the optical fiber connector, and a graded index lens may be disposed in an end where the optical fiber connector and the arrayed waveguide grating may connect. With this structure, the number of the coupling is reduced, which in turn may improve the integrity of the product.

BRIEF DESCRIPTION OF THE DRAWINGS

The present disclosure will become more understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

As shown in FIG. 1 to FIG. 6, the present disclosure provides a multi-channel parallel optical receiving device which includes a carrier 8 and a light receiving chip 2. A plurality of optoelectronic diodes 3 may be disposed on a top surface of an end of the carrier 8, and the plurality of optoelectronic diodes 3 may be electrically connected to the light receiving chip 2. The light receiving chip 2 of this embodiment may be a trans-impedance amplifier (TIA) chip, and the optoelectronic diodes 3 and the trans-impedance amplifier (TIA) chip may be connected by bonding wires. An optical fiber connector 4 may be disposed at another end of the carrier 8, and an arrayed waveguide grating 6 may be further disposed on the top surface of the carrier 8. An input end 61 of the arrayed waveguide grating 6 may be connected to the optical fiber connector 4 for receiving an optical signal from the optical fiber. The optical signals may be divided into multi-channel optical signals in parallel by the arrayed waveguide grating 6 based on their wavelengths. The top surface 63 of an output end 62 of the arrayed waveguide grating 6 may be designed to be at a predetermined angle, allowing for the multi-channel optical signals to be reflected by the top surface 63 to the photosensitive surfaces of the plurality of optoelectronic diodes 3 arranged in array.

Figure 1:
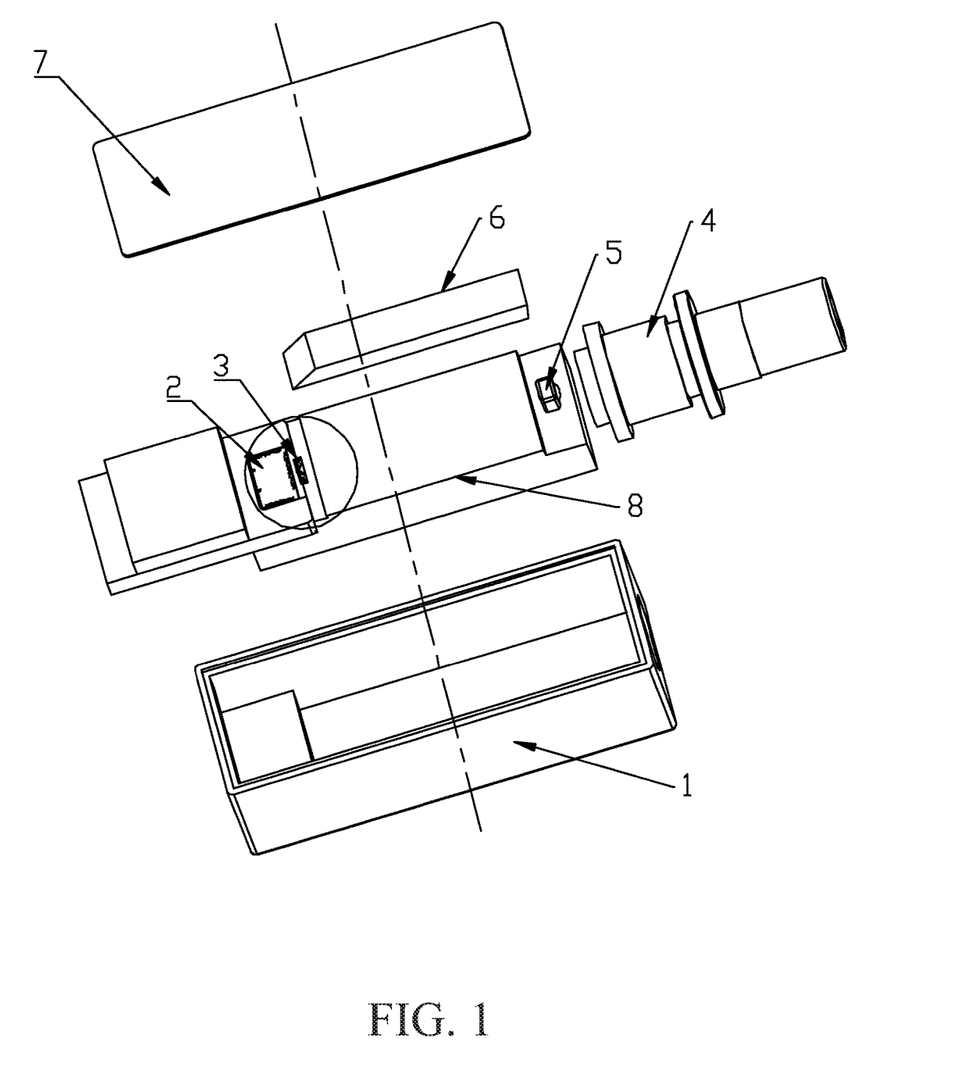
FIG. 1 shows a an exploded view of a structure of the present disclosure.
Figure 2:
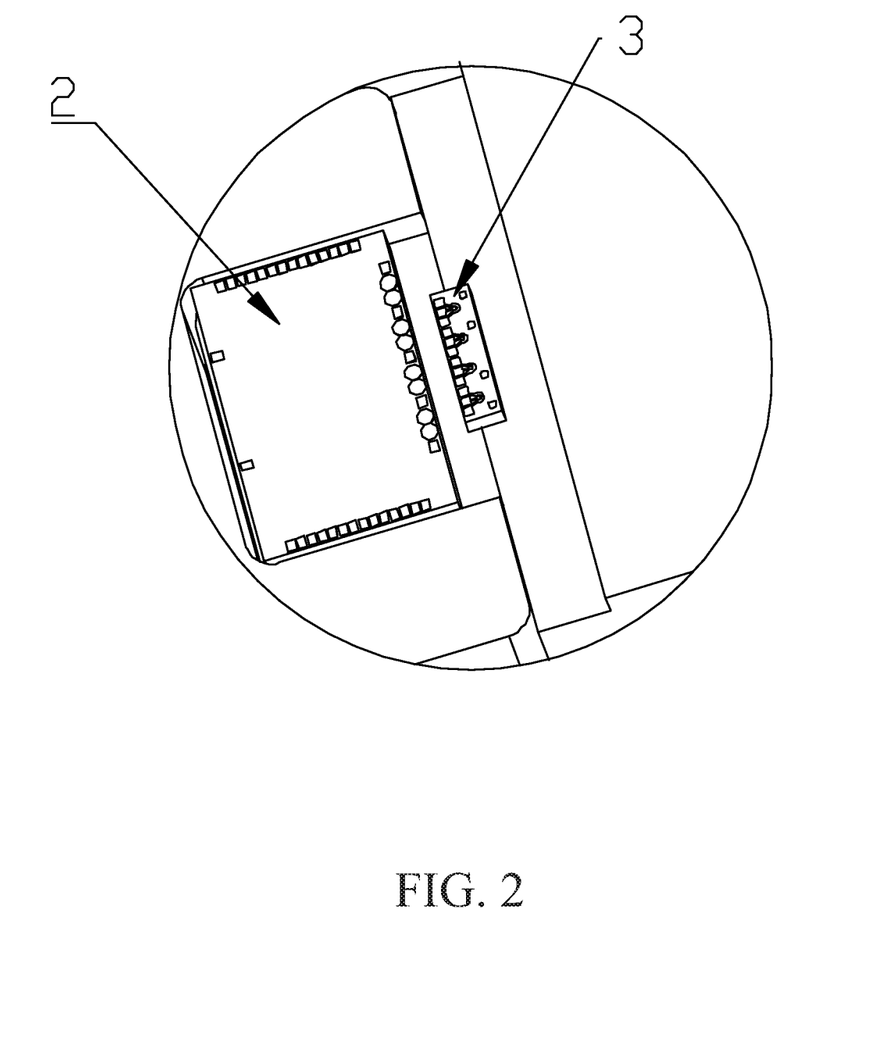
FIG. 2 shows an enlarged view of a structure in FIG. 1.
Figure 3:
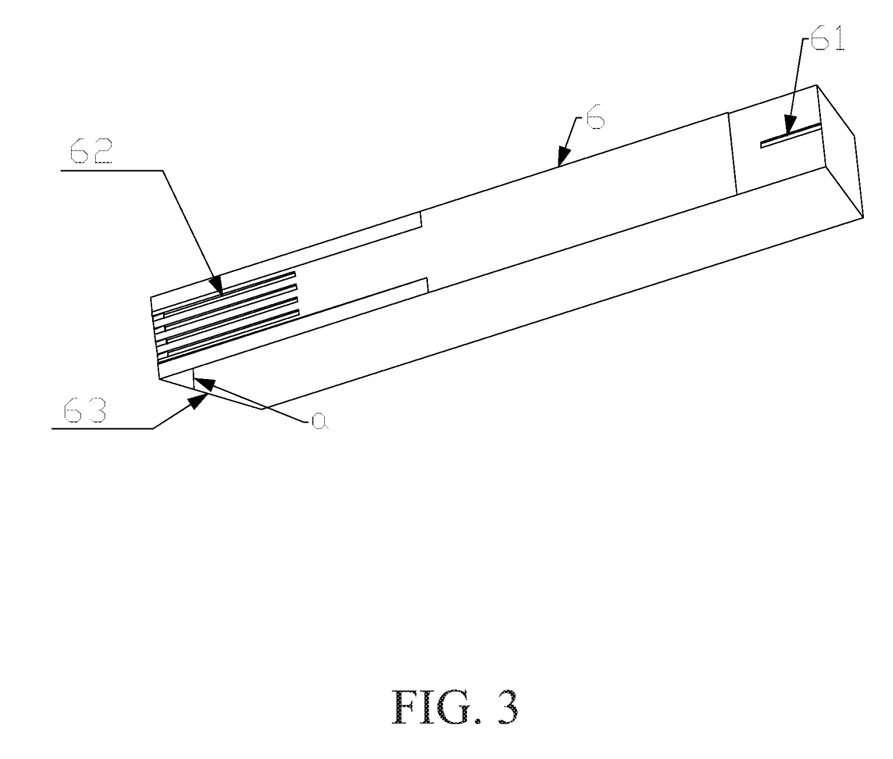
FIG. 3 shows perspective view of a structure of an arrayed waveguide grating.

The optical receiving module of this embodiment may further include a bottom shell 1 and top cap 7, defining a space in which the aforementioned structure may be placed so that the aforementioned structure may be protected. Some other shell bodies may be used in the present disclosure to serve the protection purpose. The light receiving chip 2 may be connected to a flexible circuit board 9 by the bonding wires, and the flexible circuit board 9 may be used to connect to other devices of the optical device. The arrayed waveguide grating 6 may include an input end 61 and an output end 62, and the optical signal may be input from the input end. Since a wavelength division multiplexing technology may be used in the optical fiber of the present disclosure, the signals with different wavelengths may be divided into the multi-channel optical signals and output from the output end. The arrayed waveguide grating is a well-known technology, in which the plurality of optical filters capable of filtering the optical signals in different wavelengths is used, so that each of the channels may transmit the optical signal having the specific wavelength range, and the optical signals from the optical fiber may be divided before being outputted. The top surface 63 may be an inclined plane, enabling the reflection of the optical signal upon the top surface 63. The reflected optical signal may be transmitted to the photosensitive surface of the plurality of optoelectronic diodes 3 on the carrier 8 since the top surface 63 may tilt at a predetermined angle. Generally speaking, the optical paths from the output end 62 of the arrayed waveguide grating 6 may correspond to the optoelectronic diodes 3. This embodiment here shows four channels as an example, as the amount of the channels could be based on the actual demand.

With the aforementioned structure, the present disclosure has following features. In the present disclosure, the top surface 63 of the arrayed waveguide grating 6 may be designed to be with a predetermined angle. Therefore, the optical signals emitting from the arrayed waveguide grating 6 may be reflected by the top surface 63 to the photosensitive surfaces of the plurality of optoelectronic diodes. Based on such design, after the position of the optoelectronic diodes is determined, only a placement groove or a guiding structure for the arrayed waveguide grating 6 may be needed on the carrier 8 to guide the arrayed waveguide grating 6 to be in the position aligning with the optoelectronic diodes. Accordingly, the arrayed waveguide grating may be installed without much difficulty, and the coupling between the arrayed waveguide grating 6 and the optoelectronic diodes may be no longer necessary. Further, the optoelectronic diodes and the light receiving chip 2 may be disposed on the same surface, reducing length of the bonding wire to improve the integrity and lower the manufacturing cost.

The plurality of optoelectronic diodes may be disposed on the same circuit board. The position of the optoelectronic diodes may become definitive so as to simplify and streamline the manufacturing process. The optoelectronic diodes may be disposed onto the carrier 8 simultaneously, minimizing the iteration of disposing the optoelectronic diodes.

The amount of the optoelectronic diodes may be equal to the amount of the optical paths divided by the arrayed waveguide grating 6.

The predetermined angle of the top surface 63 of an output end 62 of the arrayed waveguide grating 6 may be 41 to 46 degrees.

The predetermined angle of the top surface 63 of the output end 62 of the arrayed waveguide grating 6 may be 42 degrees.

Figure 4:
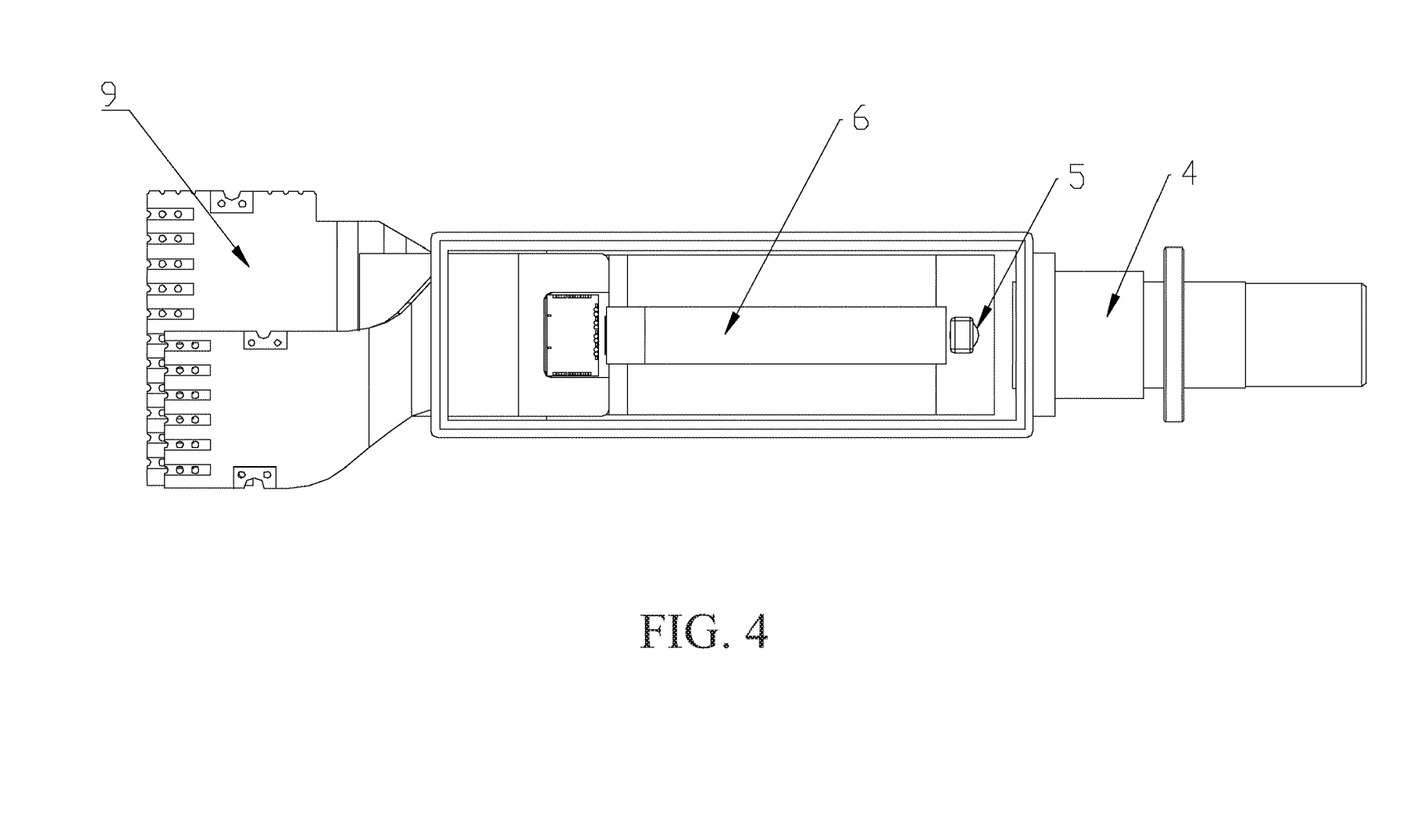
FIG. 4 shows a perspective view of a structure according to a first embodiment of the present disclosure.

FIG. 4 is an embodiment of the present disclosure in which first lens 5, for coupling the optical fiber, may be disposed between the input end 61 of the arrayed waveguide grating 6 and the optical fiber connector 4. In this embodiment, the first lens 5 disposed on the carrier 8 may be located on the optical path of the optical fiber connector 4 and the arrayed waveguide grating 6, for the optical coupling to be realized.

Figure 5:
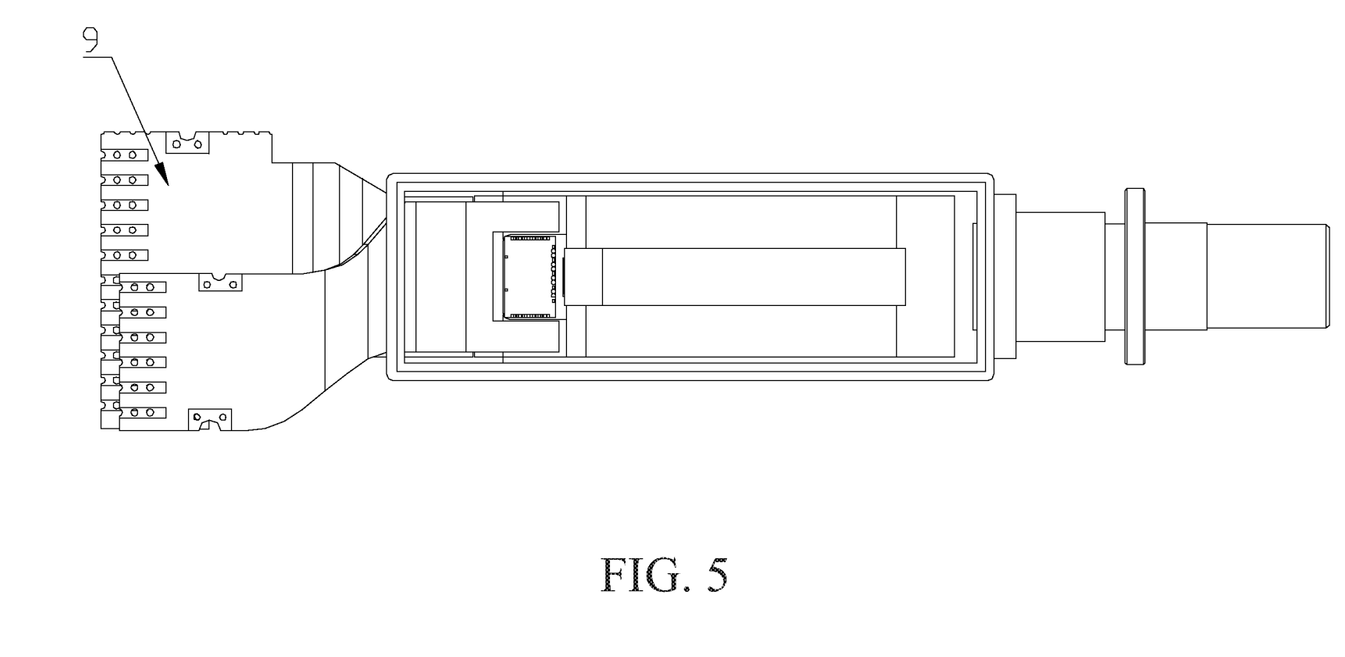
FIG. 5 shows a perspective view of a structure according to a second embodiment of the present disclosure.
Figure 6:
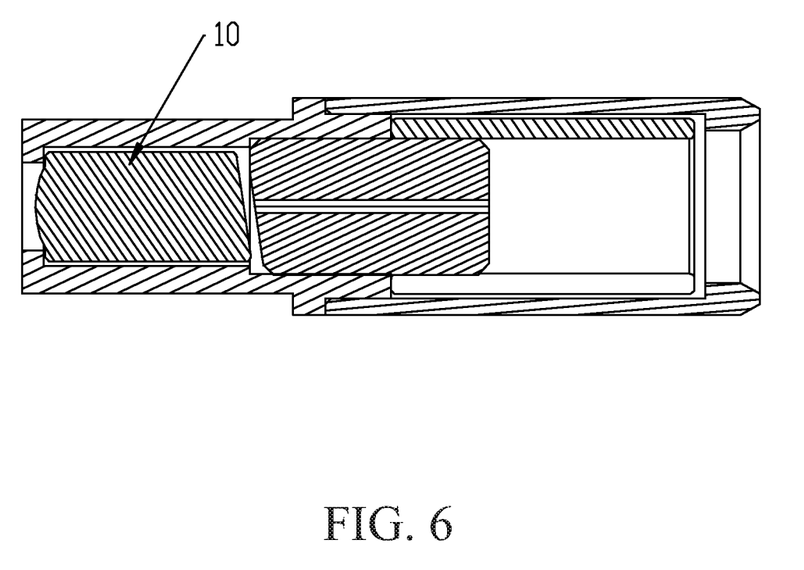
FIG. 6 shows a sectional view of an optical fiber connector according to a second embodiment of the present disclosure.

FIG. 5 to FIG. 6 show a second embodiment of the present disclosure in which the input end 61 of the arrayed waveguide grating 6 may be inserted directly into the optical fiber connector 4, and a graded index lens 10 may be disposed on a end where the optical fiber connector 4 and the arrayed waveguide grating 6 may connect. With this structure, the lens does not need to be coupled on the carrier 8, reducing the number of the optical coupling and increasing the integrity of the entire product.

The foregoing description, for the purpose of explanation, has been described with reference to specific embodiments; however. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

What is claimed is:

1. A multi-channel parallel optical receiving device, comprising:
   a carrier;
   a light receiving chip disposed on a top surface of an end of the carrier;
   a plurality of optoelectronic diodes disposed on the top surface of the end of the carrier, and the plurality of optoelectronic diodes electrically connected to the light receiving chip via bonding wire, wherein the optoelectronic diodes and the light receiving chip are disposed directly on the same top surface of the end of the carrier;
   an optical fiber connector disposed in an end of the carrier;
   an arrayed waveguide grating further disposed on a top surface of the carrier that defines a midpoint of the carrier, the arrayed waveguide grating having a first end, a middle, and a second end disposed opposite the first end, and an input end of the arrayed waveguide grating connected to the optical fiber connector for receiving an optical signal from the optical fiber, wherein the top surface of the carrier underlies the middle of the arrayed waveguide grating; and wherein the optical signal is divided into multi-channel optical signals in parallel by the arrayed waveguide grating based on their wavelengths, a top surface defined by an output end of the arrayed waveguide grating is at a predetermined angle, causing the multi-channel optical signals reflected by the top surface defined by the output end of the arrayed waveguide grating to be reflected to a photosensitive surface of the plurality of optoelectronic diodes arranged in parallel, wherein the predetermined angle of the top surface defined by the output end of the arrayed waveguide grating is in a range of 41 to 46 degrees such that the top surface provides the reflection.

2. The multi-channel parallel optical receiving device according to claim 1, wherein the top surface of the end of the carrier is defined at least in part by a circuit board, and wherein the plurality of optoelectronic diodes and the light receiving chip are directly disposed on the circuit board.

3. The multi-channel parallel optical receiving device according to claim 1, wherein the amount of the optoelectronic diodes is equal to the amount of optical paths divided by the arrayed waveguide grating.

4. The multi-channel parallel optical receiving device according to claim 1, wherein the predetermined angle of the top surface of the output end of the arrayed waveguide grating is 42 degrees.

5. The multi-channel parallel optical receiving device according to claim 1, wherein a first lens, for coupling the optical fiber, is disposed between the input end of the arrayed waveguide grating and the optical fiber connector.

6. The multi-channel parallel optical receiving device according to claim 1, wherein the input end of the arrayed waveguide grating is inserted directly into the optical fiber connector and a graded index lens is disposed in an end where the optical fiber connector and the arrayed waveguide grating connect.

7. A multi-channel parallel optical receiving device, comprising:
 a carrier;
 a light receiving chip disposed on a top surface of an end of the carrier;
 a plurality of optoelectronic diodes disposed on the top surface of the end of the carrier, and the plurality of optoelectronic diodes electrically connected to the light receiving chip via wire bonding, wherein the plurality of optoelectronic diodes and the light receiving chip are directly disposed on the same top surface of the end of the carrier;
 an optical fiber connector disposed in an end of the carrier;
 an arrayed waveguide grating further disposed on a top surface of the carrier that defines a midpoint of the carrier, the arrayed waveguide grating having a first end, a middle, and a second end disposed opposite the first end, and an input end of the arrayed waveguide grating connected to the optical fiber connector for receiving an optical signal from the optical fiber;
 wherein the top surface of the carrier that defines the midpoint of the carrier underlies the middle of the arrayed waveguide grating; and
 wherein the optical signal is divided into multi-channel optical signals in parallel by the arrayed waveguide grating based on their wavelengths, a top surface defined by an output end of the arrayed waveguide grating is at a predetermined angle of 42 degrees, causing the multi-channel optical signals reflected by the top surface defined by the output end of the arrayed waveguide grating to be reflected to a photosensitive surface of the plurality of optoelectronic diodes arranged in parallel.

* * * * *

UNITED STATES PATENT AND TRADEMARK OFFICE
CERTIFICATE OF CORRECTION

PATENT NO. : 10,379,301 B2  
APPLICATION NO. : 15/432242  
DATED : August 13, 2019  
INVENTOR(S) : Luo et al.

Page 1 of 1

It is certified that error appears in the above-identified patent and that said Letters Patent is hereby corrected as shown below:

On the Title Page

Item (73), in Column 1, under "Assignee", delete "Applied Optoelectronics, Inc., Sugar Land, TX (US)" and insert -- Global Technology Inc., Ningbo (CN) --, therefor.

Signed and Sealed this  
Eighth Day of November, 2022

Katherine Kelly Vidal  
*Director of the United States Patent and Trademark Office*